UNITED STATES PATENT OFFICE.

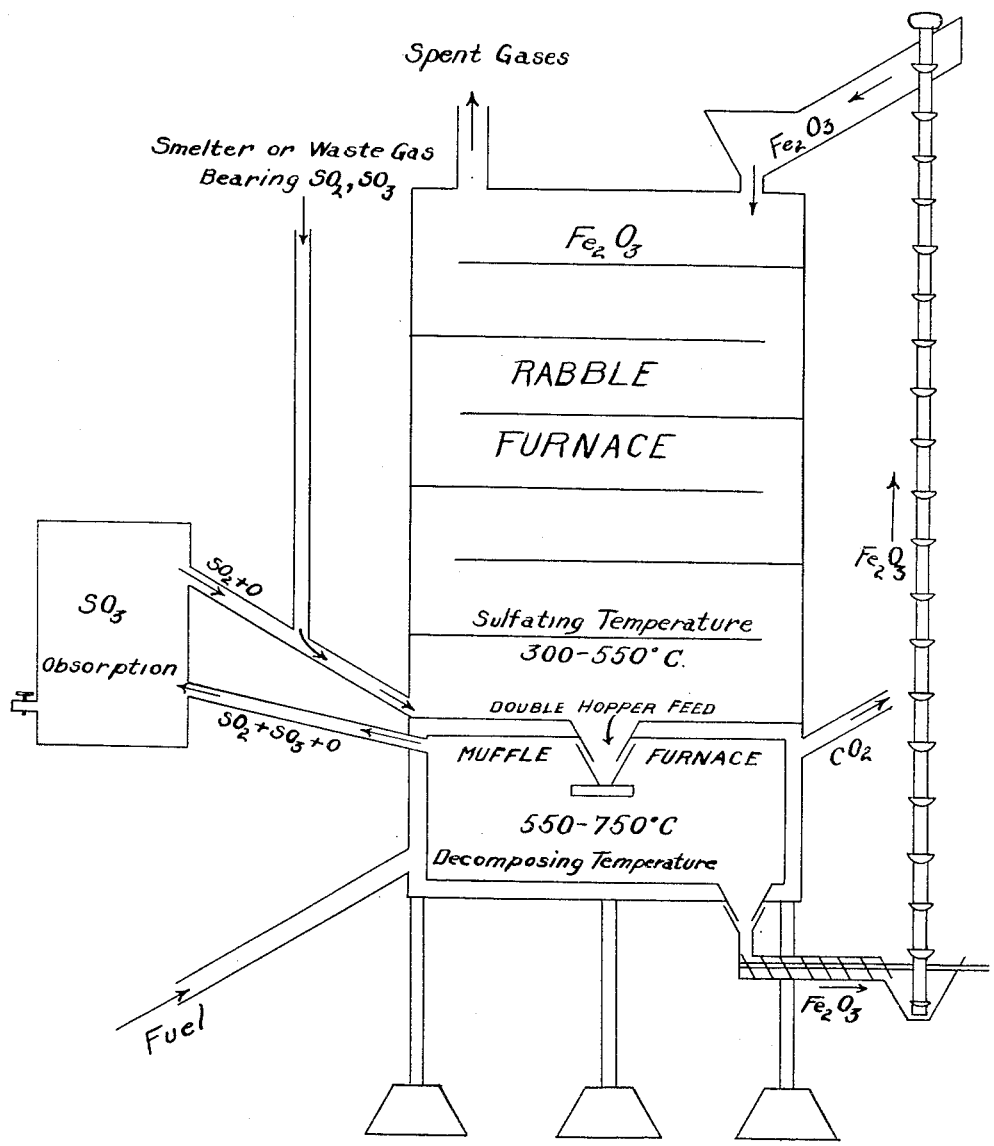

MELVILLE F. COOLBAUGH, OF GOLDEN, COLORADO.

PROCESS FOR THE PURIFICATION OF SULPHUR-BEARING GASES AND CONCENTRATION OF THEIR SULPHUR CONTENT.

1,412,452.  Specification of Letters Patent.  Patented Apr. 11, 1922.

Application filed April 29, 1919. Serial No. 293,556.

*To all whom it may concern:*

Be it known that I, MELVILLE F. COOLBAUGH, a citizen of the United States, residing at Golden, county of Jefferson and State of Colorado, have invented certain new and useful Improvements in Processes for the Purification of Sulphur-Bearing Gases and Concentration of Their Sulphur Content; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of the invention is to absorb sulphur gases from smelter or other waste gases, and to recover such sulphur gases and render them available in concentrated form, as for the production of sulphuric acid.

The existence of sulphur gases in smelter smoke has caused considerable friction between the metallurgical and agricultural industries. Court decisions have been rendered which require the practical absence of sulphuric acid from the smoke and the reduction of the sulphur dioxid content to less than 0.75% by volume. The present invention makes it possible to remove the sulphuric acid completely and keep the sulphur dioxid content far below the figures given above. Experiments have shown that it is not difficult to reduce the sulphur dioxid to one-tenth of one per cent or less, even from gases which originally did not contain more than one per cent of this constituent.

The process of absorption of the sulphur gases relies upon the fact that ferric oxid ($Fe_2O_3$) is a powerful absorbent for both sulphur dioxid ($SO_2$) and sulphur trioxid ($SO_3$) in the presence of oxygen or air at temperatures between 300 and 550 degrees C. (particularly about 450° C. for maximum efficiency), with the formation of either normal ferric sulphate or basic ferric sulphate according to the following chemical reactions:

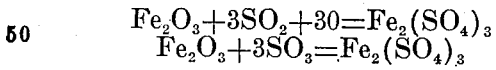
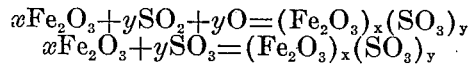

When the temperature is low and an excess of sulphur gases is brought in contact with the ferric oxid, the normal ferric sulphate tends to form. When the temperature is high and an excess of ferric oxid is brought in contact with the sulphur gases, the basic sulphate tends to form. The composition of the basic ferric sulphate probably conforms to the formula $Fe_2O^3.2SO_3$. The process of recovery of the sulphur gases relies upon the fact that when ferric sulphate or basic ferric sulphate is heated at temperatures between 550 and 750 degrees C. (particularly about 650° C. for greatest efficiency) ferric oxid is formed and sulphur trioxid or sulphur dioxid and oxygen are liberated, thus reversing the chemical reactions given above. Since this decomposition reaction can be effected in the absence or nearly complete absence of air, the production of sulphur gases of high concentration is made possible. The proportion of sulphur dioxide, sulphur trioxid and oxygen which will be formed in the resulting gases will depend upon temperature, time and pressure. If the temperature is low enough, only sulphur trioxid should form. As the temperature rises, this tends to react as follows: $SO_3 = SO_2 + O$. The faster the sulphur trioxid is removed from the influence of heat, the less will be the decomposition. High pressures tend to increase, and low pressures to diminish, decomposition.

The process as set forth diagrammatically in the accompanying drawing is for illustration only. It is immaterial what kind of apparatus is used, the only requirement being that the ferric oxid be kept in contact with the sulphur gases for a sufficient time at the required temperature, and that the ferric sulphates be heated out of contact with the air or products of combustion in order to produce concentrated gases. In the illustration, ferric oxid is fed into the top of a rabble or other roasting furnace and the sulphur gases are introduced into the bottom of the same furnace. The temperature of the furnace is kept between 300 and 550 degrees C. by employing the hot gases directly from roasting furnaces or smelters. If these gases are too hot for efficient absorption of the sulphur constituents, they may be cooled before entering the absorption chamber. If the gases are too cold for efficient absorption, they may be heated properly by utilizing the waste heat from the decomposition of the sulphate. By proper control of the speed of the gases, and the travel of the ferric oxid, and of the temperature, 90% or more of the sulphur gases will be rapidly absorbed. The hot ferric sulphates formed are discharged from the bottom of the furnace together with any excess ferric oxid into a muffle furnace maintained at a temperature between 550 and 750 degrees C. where the sulphates are changed back to ferric oxid and sulphur gases liberated. The ferric oxid is removed and elevated to the top of the rabble furnace for reuse. If desired, the muffle may be maintained under a partial vacuum in order to keep the sulphur trioxid from decomposing, or the gases produced may be made to come in contact with finely divided platinum at the proper temperature to reconvert the sulphur dioxid and oxygen into sulphur trioxid (in either case the sulphur trioxid may be absorbed by known methods), or the sulphur trioxid formed in the muffle without vacuum or the influence of finely divided platinum may be absorbed directly and separated from the sulphur dioxid which may be fed back into the system as shown in the illustration, or may be used for sulphating other ores or for any other purpose desired, for example, for the production of liquid sulphur dioxid, sulphites, and the like. When concentrated sulphur gases, if produced, would have no value, the ferric sulphates formed may be thrown on the dump, where they gradually form a cement, holding the dump together and eliminating the dust nuisance.

If no sulphur trioxid were decomposed in the muffle furnace and there were no access of outside gases, it would be possible to produce 100% $SO_3$. If all of the sulphur trioxid were decomposed into sulphur dioxid and oxygen and there were no access of outside gases, the resulting gas would have a composition of $66\frac{2}{3}\%$ $SO_2$ and $33\frac{1}{3}\%$ oxygen by volume. Since the amount of outside gases entering the muffle can be kept low, and since the decomposition of the sulphur trioxid can be controlled to an appreciable extent, it will be seen that the composition of the resulting sulfur gases can be maintained at a high percentage, and the manufacture of sulphuric acid or liquid sulphur dioxid thereby simplified.

I claim:

1. The process of recovering sulphur gases from other gases, comprising passing said gases over an oxid of a metal at a temperature sufficient to form a sulphate from said oxid, and then heating said sulphate in the absence of substantial quantities of gases other than sulphur gases at a temperature sufficient to liberate sulphur dioxid and sulphur trioxide, the steps of the process following one another continuously.

2. The process of recovering sulphur gases from other gases, comprising passing said gases over an oxid of a metal at a temperature sufficient to form a sulphate from said oxid, then heating said sulphate in the absence of substantial quantities of gases other than sulphur gases at a temperature sufficient to liberate sulphur dioxid and sulphur trioxide, absorbing said sulphur trioxid, and returning the unabsorbed sulphur dioxid for retreatment with said metal oxid, the steps of the process following one another continuously.

3. The process of treating waste gases for removal of sulphur gases therein, comprising passing said gases over a metal oxid at a temperature sufficient to form a sulphate, removing the sulphate and heating the same in the absence of substantial quantities of gases other than sulphur gases at a temperature sufficient to decompose the sulphate and liberate sulphur gases, the steps of the process following one another continuously.

4. The process of treating waste gases for removal of sulphur gases therein, comprising passing said gases over iron oxid at a temperature to form iron sulphate, removing said sulphate, heating the same in the absence of substantial quantities of gases other than sulphur gases at a temperature to decompose the sulphate and liberate sulphur dioxid and sulphur trioxid, and drawing off said sulphur gases in concentrated form, the steps of the process following one another continuously.

5. The process of treating waste gases for removal of sulphur gases therein, comprising passing said gases over iron oxid at about 450° C. to form iron sulphate, removing said sulphate, heating the same in the absence of substantial quantities of gases other than sulphur gases at about 650° C. to decompose the sulphate and liberate sulphur dioxid and sulphur trioxid, and drawing off said sulphur gases in concentrated form, the steps of the process following one another continuously.

6. The process of treating waste gases for removal of sulphur gases therein, comprising passing said gases over iron oxid at a temperature between 300° C. and 550° C. to form iron sulphate, removing said sulphate, heating the same in the absence of substantial quantities of gases other than sulphur gases at a temperature between 550° C. and 750° C. to decompose the sulphate and liberate sulphur dioxid and sulphur trioxid, and drawing off said sulphur gases in concentrated form, the steps of the process following one another continuously.

7. The process of treating waste gases for removal of sulphur gases therein, comprising passing said gases over an oxid of a metal at a temperature between 300° C. and 550° C. to form a sulphate, removing said sulphate, heating the same in the absence of substantial quantities of gases other than sulphur gases at a temperature between 550° C. and 750° C. to decompose the sulphate and liberate sulphur dioxid and sulphur trioxid, and drawing off said sulphur gases in concentrated form, the steps of the process following one another continuously.

8. The process of recovering sulphur gases from other gases, comprising passing said gases over iron oxid at a temperature sufficient to form a sulphate from said oxid, and then heating said sulphate in the absence of substantial quantities of gases other than sulphur gases at a temperature sufficient to liberate sulphur dioxid and sulphur trioxide, the steps of the process following one another continuously.

9. The process of separating sulphur gases from waste gases to purify said waste gases, comprising passing said gases over iron oxid at a temperature between 300° C. and 550° C. to form iron sulphate by combination of the sulphur gases with the iron oxid and removing the sulphate from said waste gases, the steps of the process following one another continuously.

10. The process of separating sulphur gases from waste gases to purify the latter of said sulphur gases, comprising passing said gases over iron oxid at a temperature of about 450° C. to form iron sulphate by combination of the sulphur gases with the iron oxid and removing the sulphate from said waste gases, the steps of the process following one another continuously.

11. A process for purifying sulphur-bearing waste gases by separating the sulphur gases from the waste gases, comprising passing said gases over a metal oxid capable of reacting with the gases to form a sulphate at a temperature to form such sulphate by combination of the sulphur gases with the oxid, and removing the resulting sulphate from said waste gases, the steps of the process following one another continuously.

12. A process for purifying sulphur-bearing waste gases by separating the sulphur gases from the waste gases, comprising passing said gases over heated iron oxid at a temperature to form iron sulphate by combination of the sulphur gases with the iron oxid, and removing the resulting iron sulphate from said waste gases, the steps of the process following one another continuously.

In testimony whereof I affix my signature.

MELVILLE F. COOLBAUGH.